(12) United States Patent
Choi et al.

(10) Patent No.: US 9,723,417 B2
(45) Date of Patent: Aug. 1, 2017

(54) APPARATUS FOR INPUTTING AUDIOGRAM USING TOUCH INPUT

(71) Applicant: Samsung Electronics Co., Ltd., Suwon-si (KR)

(72) Inventors: Jong Min Choi, Seoul (KR); Yun Seo Ku, Seoul (KR); Jun Il Sohn, Yongin-si (KR); Dong Wook Kim, Seoul (KR); Jun Whon Uhm, Anyang-si (KR); Sang Wook Kim, Seoul (KR); Jong Jin Kim, Dongducheon-si (KR); Jong Hee Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 14/248,687

(22) Filed: Apr. 9, 2014

(65) Prior Publication Data

US 2014/0307900 A1 Oct. 16, 2014

(30) Foreign Application Priority Data

Apr. 16, 2013 (KR) .......................... 10-2013-0041468

(51) Int. Cl.
*G06F 3/048* (2013.01)
*H04R 25/00* (2006.01)
*G06F 3/0488* (2013.01)

(52) U.S. Cl.
CPC ........... *H04R 25/70* (2013.01); *G06F 3/0488* (2013.01); *G06F 3/04883* (2013.01)

(58) Field of Classification Search
CPC ..................................................... G06F 3/0488
See application file for complete search history.

(56) References Cited

U.S. PATENT DOCUMENTS

| | | | |
|---|---|---|---|
| 2002/0076056 A1 | 6/2002 | Pavlakos | |
| 2002/0151995 A1* | 10/2002 | Jorgenson | ................ H04R 5/04 700/94 |
| 2004/0071296 A1 | 4/2004 | Wasden | |
| 2006/0277999 A1 | 12/2006 | Raviv | |
| 2007/0156063 A1* | 7/2007 | Zoth | ..................... A61B 5/121 600/559 |
| 2009/0288489 A1 | 11/2009 | Lee et al. | |
| 2011/0038498 A1* | 2/2011 | Edgar | ..................... G06F 3/016 381/314 |

(Continued)

FOREIGN PATENT DOCUMENTS

| | | |
|---|---|---|
| JP | 2008-125587 A | 6/2008 |
| KR | 10-2009-0113162 A | 10/2009 |

(Continued)

OTHER PUBLICATIONS

Extended European Search Report issued May 26, 2014, in counterpart European Patent Application No. 14152368.8 (7 pages in English).

*Primary Examiner* — Peiyong Weng
(74) *Attorney, Agent, or Firm* — NSIP Law

(57) ABSTRACT

An apparatus and a method for inputting audiogram using a touch input are provided. An audiogram input apparatus includes: an input receiver configured to receive a touch input from a user; a data processor configured to generate an audiogram corresponding to the touch input; and a display unit configured to display the generated audiogram.

20 Claims, 9 Drawing Sheets

(56) References Cited

U.S. PATENT DOCUMENTS

2011/0280409 A1\* 11/2011 Michael ................... H04R 5/04
                                                                                             381/60
2013/0060159 A1\* 3/2013 Bromwich ............... A61B 5/12
                                                                                            600/559

FOREIGN PATENT DOCUMENTS

| KR | 10-2011-0090066 A | 8/2011 |
| KR | 10-2011-0118967 A | 11/2011 |
| KR | 10-2012-0069813 A | 6/2012 |
| KR | 10-2012-0091698 A | 8/2012 |

\* cited by examiner

APPARATUS FOR INPUTTING AUDIOGRAM USING TOUCH INPUT

CROSS-REFERENCE TO RELATED APPLICATION(S)

This application claims the benefit under 35 USC 119(a) of Korean Patent Application No. 10-2013-0041468 filed on Apr. 16, 2013, in the Korean Intellectual Property Office, the entire disclosure of which is incorporated herein by reference for all purposes.

BACKGROUND

1. Field

The following description relates to an audiogram input apparatus, an apparatus for inputting an audiogram of a user using a touch input, and a method of inputting an audiogram.

2. Description of Related Art

To compensate for hearing loss of a patient that varies at different frequencies, an audiogram of the patient's hearing loss may be obtained. An audiogram refers to a graph indicating auditory thresholds according to various frequencies that indicate a degree of hearing loss of a patient. Auditory thresholds are the softest sounds an individual can detect. Numerical values corresponding to the auditory thresholds according to each frequency may be manually entered to a computer so as to indicate the auditory levels of a patient.

However, when the auditory thresholds are determined for eight to twelve different frequencies, it is inconvenient to manually input the auditory thresholds one by one. That is, it is inconvenient to obtain an audiogram by repeatedly inputting the values corresponding to the auditory thresholds of a patient corresponding to each frequency several times into a computer or by marking the auditory thresholds corresponding to each frequency directly on a graphing paper. The process of manually processing the values corresponding to the auditory thresholds can be time consuming and laborious.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an audiogram input apparatus including: an input receiver configured to receive a touch input from a user; a data processor configured to generate an audiogram corresponding to the touch input; and a display unit configured to display the generated audiogram.

The input receiver may be configured to receive the touch input in a form of a point or a line via a touch screen.

The data processor may be configured to match a coordinate corresponding to the point or the line input via the touch screen to an auditory threshold at a frequency.

The data processor may be configured to modify the audiogram generated corresponding to the touch input according to a pre-quantified audiogram that is quantified in advance in response to the pre-quantified audiogram being registered.

The input receiver may be configured to sequentially receive a first touch input for selecting an auditory threshold corresponding to a frequency in the audiogram and a second touch input for selecting a feature control mode corresponding to the auditory threshold.

The feature control mode may include echo cancellation or feedback cancellation corresponding to the auditory threshold.

The input receiver may be configured to sequentially receive a first touch input for selecting the audiogram and a second touch input for shifting the entire audiogram.

The second touch input may include a touch input for dragging the entire audiogram, and the data processor may be configured to shift the entire audiogram based on a distance of the dragging.

In another general aspect, there is provided an audiogram input apparatus including: an input receiver configured to receive a touch input related to a displayed audiogram; a data processor configured to correct the audiogram corresponding to the touch input; and a display unit configured to display the corrected audiogram, in which the input receiver is configured to sequentially receive a first touch input for designating a frequency region of the audiogram and a second touch input for adjusting a threshold level of the designated frequency region.

The second touch input may include a touch input for selecting a position of the audiogram based on a touch time. The data processor may be configured to adjust the auditory threshold of the frequency region designated in the audiogram based on the touch time.

The second touch input may include a touch input for selecting a position of the audiogram by repeated touches, and the data processor may be configured to adjust the auditory threshold of the frequency region designated in the audiogram based on a number of touches.

The second touch input may include a touch input for dragging a position of the audiogram, and the data processor may be configured to adjust the auditory threshold of the frequency region designated in the audiogram base on a dragging distance or a release position.

In another general aspect, there is provided an audiogram input apparatus including: an input receiver configured to receive a touch input related to a displayed audiogram from a user; a data processor configured to correct the audiogram corresponding to the touch input; and a display unit configured to display the corrected audiogram, in which the input receiver is configured to receive a touch input for selecting a plurality of auditory thresholds of a frequency in the audiogram.

The data processor may be configured to adjust a frequency band of the audiogram based on the selected auditory thresholds.

In another general aspect, there is provided a hearing device including the audiogram input apparatus described above, and an amplifier configured to amplify sound based on the audiogram generated by the audiogram input apparatus.

In another general aspect, there is provided a method of inputting an audiogram, the method involving: receiving a touch input corresponding to one or more auditory thresholds in a form of a point or a line on a touch screen; and displaying an audiogram corresponding to the point or the line on the touch screen.

The general aspect of the method may further involve: revising the displayed audiogram according to a second touch input entered by a user; and displaying the revised audiogram on the touch screen.

The general aspect of the method may further involve transmitting data of the audiogram to a hearing device to fit the hearing device to a patient.

The general aspect of the method may further involve amplifying a sound based on data of the audiogram and outputting the amplified sound.

Other features and aspects will be apparent from the following detailed description, the drawings, and the claims.

Figure 1:
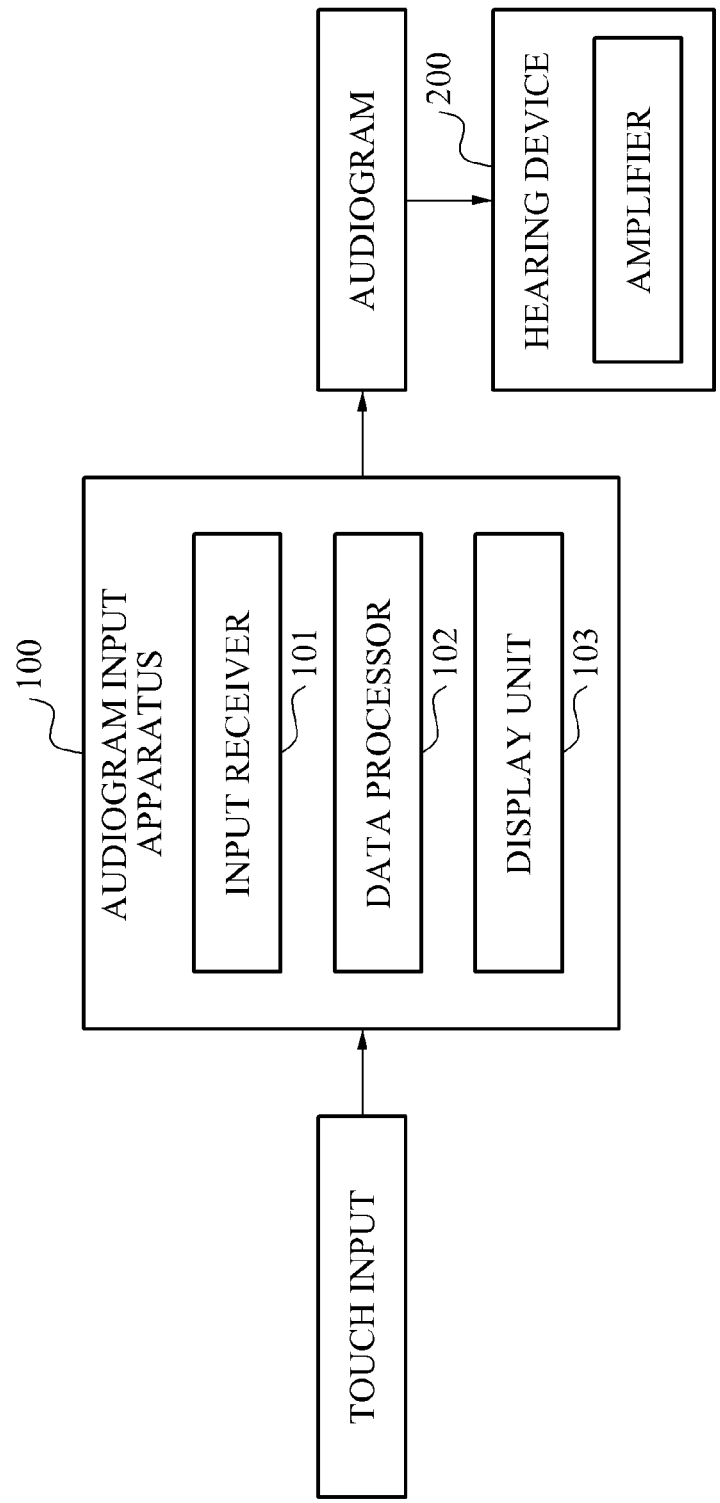
FIG. 1 is a diagram illustrating an example of an audiogram input apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

To compensate for the hearing loss of a patient, an audiogram of the patient can be used to compensate for the hearing loss experienced by the patient for each frequency within the frequency range of human hearing. However, when eight or more values corresponding to auditory thresholds are input manually one by one into a computer, the process can be time consuming. That is, it is inconvenient to express the audiogram by repeatedly inputting auditory thresholds corresponding to each frequency several times into a computer or by marking the auditory thresholds corresponding to each frequency directly on a paper. A method of easily inputting the auditory thresholds and intuitionally recognizing an audiogram based on the thresholds is desirable.

FIG. 1 illustrates an example of an audiogram input apparatus 100.

Referring to FIG. 1, the audiogram input apparatus 100 includes an input receiver 101, a data processor 102, and a display unit 103. A display unit 103 may include, for example, an LCD screen, an OLED screen, a CRT screen or a projector and a projector screen. The audiogram input apparatus 100 may be implemented as various devices that include a display screen capable of touch input. For example, the audiogram input apparatus 100 may be implemented as various multimedia devices, such as a smart phone, a mobile phone, a monitor, a tablet and the like. The touch input may be detected by a touch sensor provided in the audiogram input apparatus 100, such as a touch screen or a touch pad of a smart phone, a mobile phone, a monitor, a tablet and the like.

The input receiver 101 may receive a touch input from a user. The touch input may be transmitted to the audiogram input apparatus 100 through a finger of the user, a pen or a stylus. For example, the user may draw a point, points or lines on a display screen of the audiogram input apparatus 100 with his or her finger, pen or stylus, thereby transmitting the touch input to the audiogram input apparatus 100.

The data processor 102 may generate an audiogram based on the touch input of the user. The audiogram refers to a graph expressing auditory thresholds corresponding to various frequencies in a continuous manner. To compensate for hearing loss of a patient that varies based on frequencies, the audiogram of the patient may be transmitted to a hearing device 200, such as a hearing aid that maybe inserted into an ear, an ear implant device or any device that can aid the patient to hear better. In another example, an audiogram input apparatus 100 may be formed integrally with a hearing device 200. The hearing device 200 may then amplify an input sound conversely to the audiogram. In one example, a mobile phone with a touch screen may be used as a hearing device 200 and as an audiogram input apparatus 100. By amplifying the input sound based on the audiogram, the audiogram may be used to fit the hearing device 200 to a specific patient by allowing the hearing device 200 to correct the hearing loss of the patient based on various frequencies.

For example, when the user transmits a touch input to the audiogram input apparatus 100 by repeatedly inputting a particular point on a graph, the data processor 102 may generate an audiogram by connecting the input points. When the user transmits a touch input to the audiogram input apparatus 100 by drawing a line on a graph, the data processor 102 may generate an audiogram using the line.

For example, when the user expresses the touch input in the form of a point or a line on the display screen of the audiogram input apparatus 100, the data processor 102 may search for an auditory threshold most approximate to the point or the line input by the user, and automatically connect the most approximate auditory threshold to the point or the line.

When an already quantified audiogram is registered with the audiogram input apparatus 100, the data processor 102 may modify the audiogram generated through the touch input according to the quantified audiogram. For example, when the user input data in the form of a point or a line on a touch screen, the data processor 102 may modify the auditory threshold corresponding to the point or the line according to the quantified audiogram.

The display unit 103 may display the audiogram through the display screen of the audiogram input apparatus 100. When the user makes a correction to the audiogram displayed on the display unit 103, the audiogram may be corrected through the data processor 102. Therefore, the display unit 103 may output the corrected audiogram through the display of the audiogram input apparatus 100 in real time. The display unit 103 may be implemented as a screen that is capable of outputting graphic information to a user. For example, the display unit 103 may include a display screen, a touch screen, a projector and projector screen, and the like.

Figure 2:
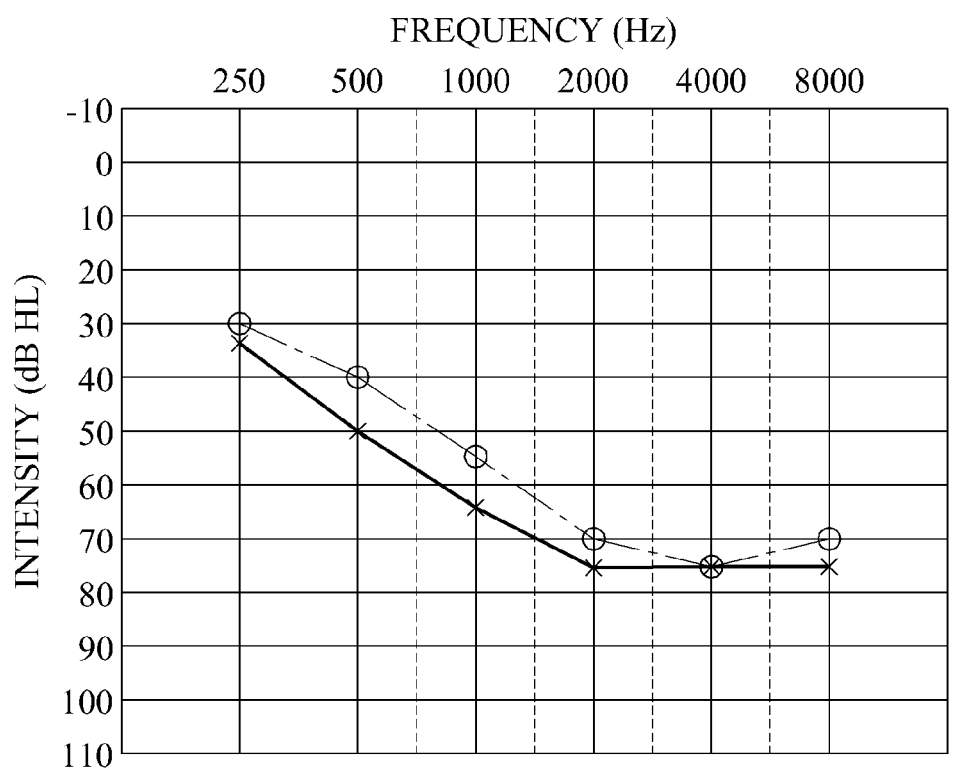
FIG. 2 is a diagram illustrating an example of a method of inputting an audiogram.

FIG. 2 illustrates an example of a process of inputting an audiogram.

FIG. 2 illustrates an audiogram obtained by inputting auditory thresholds for each predetermined frequency one by one. Such an audiogram may be obtained manually by entering each values corresponding to auditory thresholds into a computer or by graphing the points on a graphing paper. For example, to obtain the audiogram illustrated in FIG. 2, a user may enter the auditory thresholds for a set of predetermined frequencies and may connect the auditory thresholds with lines, thereby obtaining an audiogram.

The y-axis of an audiogram generally indicates intensity or loudness of sounds in decibels. The y-axis of an audiogram generally indicates frequency of sounds in Hertz. A number of auditory thresholds may be obtained for various frequencies and plotted on the graph as coordinates. For example, a number of auditory thresholds may be plotted between −10 to 110 decibels and 250 to 8000 Hertz, which is a commonly tested hearing frequency range. However, the number of auditory thresholds and the range of frequency and intensity used for plotting an audiogram may differ based on design parameters of the audiogram input apparatus, the hearing device or the availability of information regarding the patient.

Figure 3:
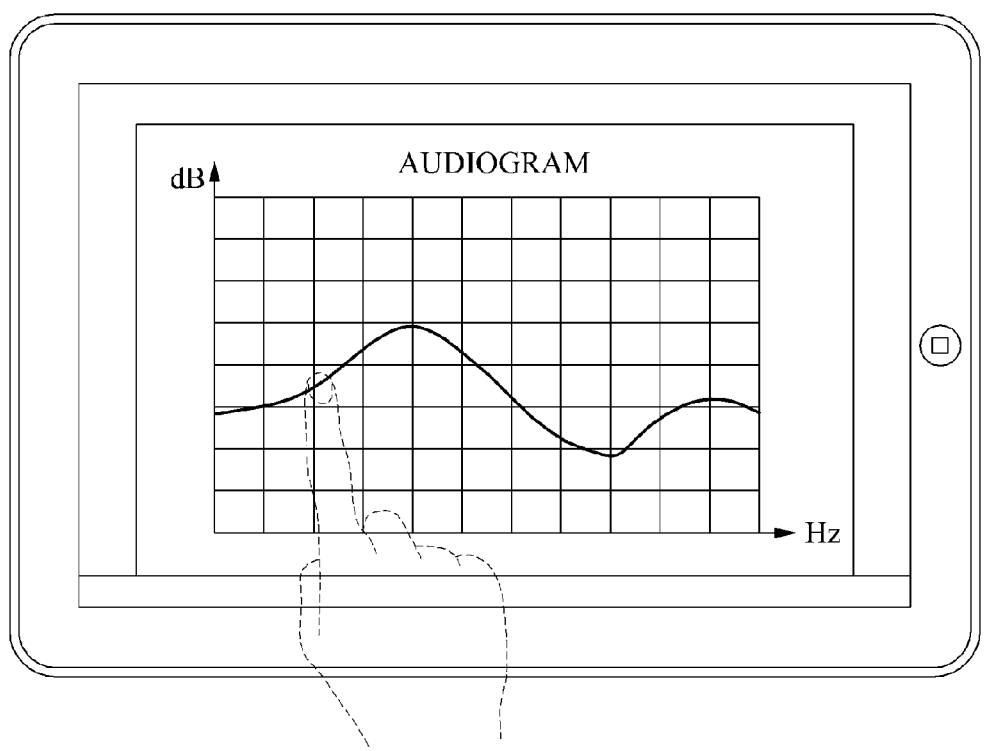
FIG. 3 is a diagram illustrating an example of a method of inputting an audiogram using a touch input.

FIG. 3 illustrates an example of a method of inputting an audiogram in which auditory thresholds per frequency are input using a touch input. For example, a user may input the auditory thresholds corresponding to a plurality of frequencies continuously by inputting individual points or by inputting a line on a touch screen, using a finger, an electronic pen or a stylus. The touch screen may display a graphing area having an y-axis of intensity and an x-axis of frequency to assist the user in inputting the auditory thresholds as coordinates on the graph. By using a touch input, the user may be able to reduce the time and workload involved in inputting the audiogram.

In one example, when the user enters a touch input expressed in the form of a point or a line on the display screen of an audiogram input apparatus, the audiogram input apparatus may search for an auditory threshold that is closest to the point or the line input by the user and may automatically connect the closest auditory threshold to the point or the line.

In addition, because the audiogram is displayed directly through the display of the audiogram input apparatus, the user may intuitively recognize and correct any wrongly input audiogram. Further, in the event that numerical data corresponding to the audiogram of a user is registered with the audiogram input apparatus in advance, the audiogram input apparatus may automatically correct the audiogram randomly drawn by the user.

Figure 4:
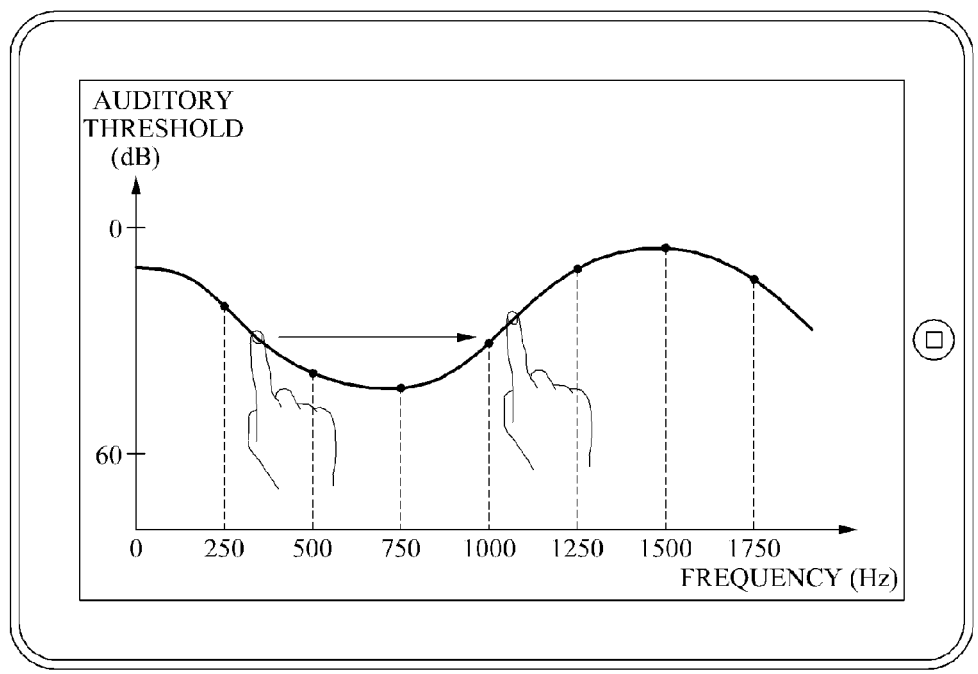
FIG. 4 is a diagram illustrating another example of a method of inputting an audiogram using a touch input.

FIG. 4 illustrates an example of a method of inputting an audiogram using a touch input in detail.

The user may input auditory thresholds for each frequency through a display screen of an audiogram input apparatus in the form of a point or a line, using a finger, a pen or a stylus. The audiogram input apparatus may generate the audiogram by connecting the points input by the user, and may output the audiogram to the user through the display screen. Also, the audiogram input apparatus may set the line input by the user directly as the audiogram and output the audiogram through the display screen.

For example, the audiogram input apparatus may search for an auditory threshold that is closest to the point input by the user or a point included in the line input by the user, and automatically connect the found auditory threshold with the point. Therefore, even when the user transmits the touch input to the audiogram input apparatus randomly by lines or points, the audiogram input apparatus may automatically adjust the audiogram.

Hereinafter, FIGS. 5 to 8 illustrate examples of methods by which an audiogram that is entered by the user may be corrected by the user. For example, the audiogram may have been entered through a touch input, using the method illustrated in FIG. 4. The audiogram input apparatus may display a menu interface that allows a user to choose between a current audiogram drawing mode and an audiogram correction mode, or to display user guides for mode conversion.

Figure 5:
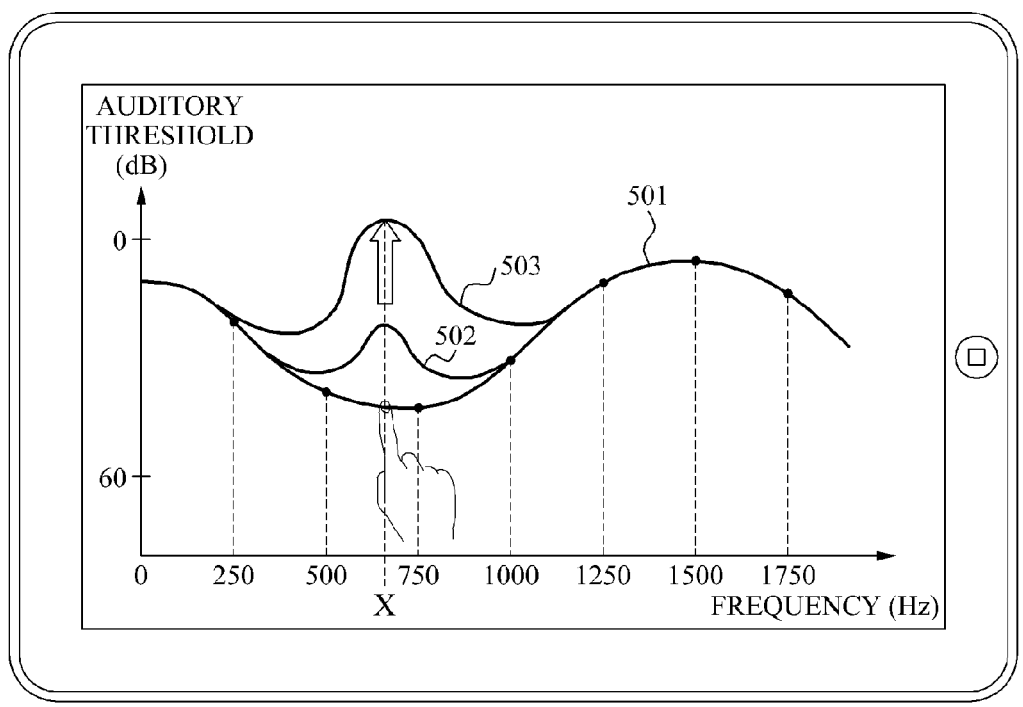
FIG. 5 is a diagram illustrating an example of a method of correcting a partial region of audiogram.

FIG. 5 illustrates an example of a method of correcting a part or a region of an audiogram 501.

Referring to FIG. 5, the user may correct a frequency region of the audiogram 501 by indicating a portion of the available range of frequencies included in the audiogram 501 through a touch input. For example, FIG. 5 illustrates a method of increasing and decreasing a level of an auditory threshold corresponding to a frequency region designated by the user. For this purpose, the audiogram input apparatus may receive a selection of a frequency region to be corrected from the user through the touch input. In addition, the audiogram input apparatus may receive a selection of a degree by which the level of the auditory threshold is to be corrected from the user, through the touch input.

When the user designates a frequency region to be corrected with reference to a frequency X in the audiogram 501, the user may touch the auditory threshold corresponding to the frequency region continuously for a predetermined time or more. In response, the audiogram input apparatus may change the audiogram 501 to audiogram 502 or audiogram 503, based on the touch input of the user corresponding to an elapsed touch time. For example, a touch time required to obtain the audiogram 503 may be longer than a touch time required to obtain the audiogram 502 from the initial audiogram 401.

In another example, the user may designate the frequency region to be corrected with reference to the frequency X in the audiogram 501, and may repeatedly touch the auditory threshold corresponding to the designated frequency region. In response, the audiogram input apparatus may change the audiogram 501 to the audiogram 502 or to the audiogram 503, based on a number of touch inputs entered by the user on the touch screen. For example, a number of touch inputs required to obtain the audiogram 503 may be greater than a number of touch inputs required to obtain the audiogram 502.

In still another example, the user may designate the frequency region to be corrected with reference to the frequency X in the audiogram 501, and drag the auditory threshold that corresponds to the designated frequency region with his or her finger, a pen or a stylus on the touch screen. In response, the audiogram input apparatus may change the audiogram 501 to the audiogram 502 or to the audiogram 503, based on a dragging distance of the touch input of the user or a position at which the drag was released. For example, a dragging distance required to obtain the audiogram 503 may be greater than a dragging distance required to obtain the audiogram 502.

Referring to FIG. 5, the user may designate the frequency region to be corrected with reference to the frequency X through the touch input in the audiogram 501. Alternatively, the user may designate the frequency region to be corrected with reference to the frequency X through the touch input on a frequency axis.

Figure 6:
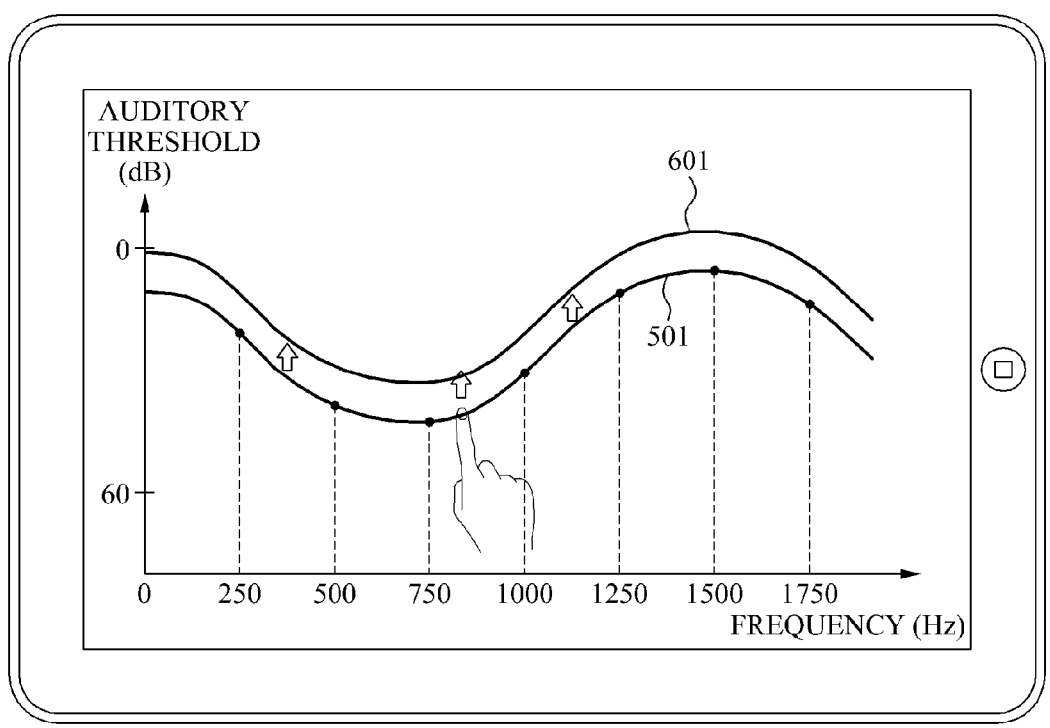
FIG. 6 is a diagram illustrating an example of a method of shirting an audiogram.

FIG. 6 illustrates an example of a method of shirting an audiogram.

Unlike the example illustrated in FIG. 5 in which an auditory threshold that corresponds to a frequency region is corrected, FIG. 6 illustrates an example in which the entire audiogram is shifted by adjusting the auditory thresholds that correspond to an entire range of frequencies present in the audiogram.

When the user selects a shift mode related to the audiogram 501, the user may shift the entire audiogram 501 through a touch input, obtaining a shifted audiogram 601.

For example, the user may select the shift mode by keep touching the audiogram 501 for a preset length of time. After the mode is converted to the shift mode, the user may drag the entire audiogram 501 in a vertical or horizontal direction.

In another example, the user may select the shift mode through the touch input in a mode conversion interface provided by the audiogram input apparatus. After the mode is converted to the shift mode, the user may drag the audiogram 501 in a vertical or horizontal direction. Therefore, the audiogram input apparatus may shift the audiogram 501 in the vertical direction or horizontal direction corresponding to a dragging distance of the touch input.

Figure 7:
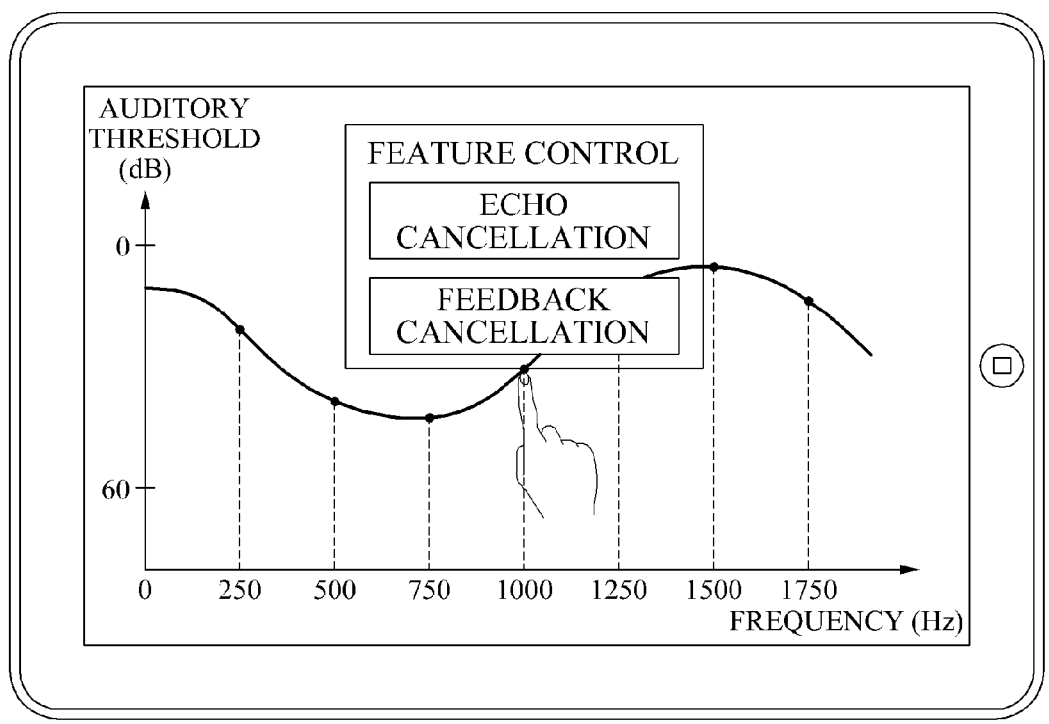
FIG. 7 is a diagram illustrating an example of a method of controlling a feature in an audiogram.

FIG. 7 illustrates an example of a method of controlling a feature in an audiogram.

When the user enters a touch input to the audiogram input apparatus, the audiogram input apparatus may display an audiogram on a display screen corresponding to the touch input. For example, the user may select a feature control mode by keep touching points corresponding to an auditory threshold that corresponds to a frequency determined by the user.

In response to the touch duration exceeding a preset length of time, the audiogram input apparatus may display the feature control mode of the auditory threshold that corresponds to the frequency that is touched by the user. For example, the feature control mode may include echo cancellation or feedback cancellation.

Figure 8:
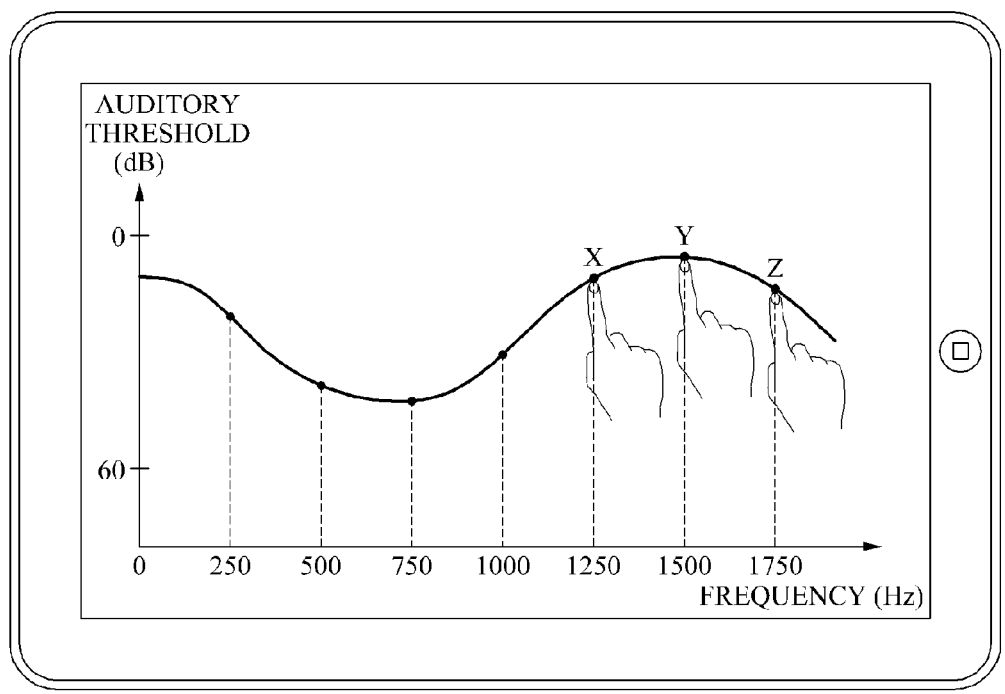
FIG. 8 is a diagram illustrating an example of a method of reducing a frequency band of an audiogram.

FIG. 8 illustrates an example of a method of reducing a frequency band of an audiogram.

Referring to FIG. 8, the user may select a plurality of auditory thresholds that correspond to a frequency through a touch input. To reduce the frequency band, the audiogram input apparatus may receive a selection of at least three auditory thresholds from the user. FIG. 8 illustrates an example in which the user selected auditory thresholds X, Y, and Z successively.

In this example, the audiogram input apparatus may reduce one frequency band by removing the auditory threshold Y. That is, although the audiogram includes a frequency band from about 1250 Hz to about 1500 Hz and a frequency band from about 1500 Hz to about 1750 Hz, the frequency band may be adjusted to from about 1250 Hz to about 1750 Hz by removing the auditory threshold Y.

For example, when the user selects an auditory threshold corresponding to about 1000 Hz, and the auditory thresholds X, Y, and Z, the audiogram input apparatus may adjust the frequency band to from about 1000 Hz to about 1750 Hz, thus reducing two frequency bands.

Figure 9:
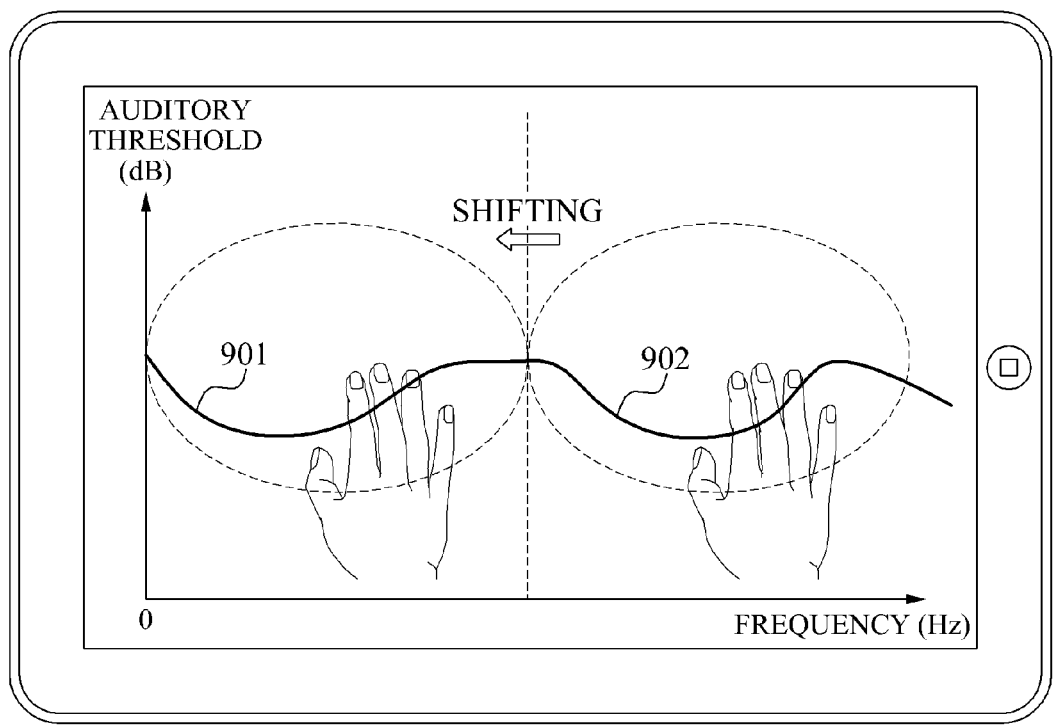
FIG. 9 is a diagram illustrating an example of a method of copying an audiogram.

FIG. 9 illustrates an example of a method of copying an audiogram.

In this example, an audiogram 902 is displayed on the audiogram input apparatus. However, when a patient with hearing loss whose audiogram corresponds to the audiogram 902 in a high frequency band region of the graph is not able to hear a low frequency band sound, an audiogram may not be displayed in the low frequency band region of the graph.

In the event that the user transmits a touch input for shifting the audiogram 902 to the low frequency band region of the graph to the audiogram input apparatus, the audiogram input apparatus may display audiogram 901, in a same shape as the audiogram 902, on the low frequency band region of the displayed graph.

The audiogram input apparatus according to one example may include an input receiver that is configured to receive a touch input from a user, a data processor that is configured to generate audiogram corresponding to the touch input, and a display unit that is configured to display the generated audiogram. The input receiver may receive the touch input expressed in the form of a point or a line through a finger, a pen or a stylus.

The data processor may match a point included in the point or the line input through the touch input to an auditory threshold corresponding to a closest frequency.

When a pre-quantified audiogram is registered with the audiogram input apparatus, the data processor may modify the audiogram generated according to the touch input based on the pre-quantified audiogram.

In another example, an audiogram input apparatus may include an input receiver configured to receive a touch input related to a displayed audiogram from a user, a data processor configured to correct the audiogram corresponding to the touch input, and a display unit configured to display the corrected audiogram. The input receiver may sequentially receive a first touch input for designating a frequency region of the audiogram and a second touch input for adjusting a threshold level of the designated frequency region.

The second touch input may include a touch input for selecting a particular position of the audiogram based on a touch time, and the data processor may adjust the auditory threshold of the frequency region designated in the audiogram based on the touch time.

The second touch input may include a touch input for selecting a particular position of the audiogram repeatedly by a number of touches, and the data processor may adjust the auditory threshold of the frequency region designated in the audiogram based on the number of touch inputs.

The second touch input may include a touch input for dragging a particular position of the audiogram, and the data processor may adjust the auditory threshold of the frequency region designated in the audiogram base on a dragging distance.

In another example, an audiogram input apparatus may include an input receiver configured to receive a touch input related to displayed audiogram from a user, a data processor configured to correct the audiogram corresponding to the touch input, and a display unit configured to display the corrected audiogram. The input receiver may sequentially receive a first touch input for selecting the audiogram and a second touch input for entirely shifting the audiogram.

The second touch input may include a touch input for entirely dragging the audiogram, and the data processor may entirely shift the audiogram based on a distance of the dragging.

In another example, an audiogram input apparatus may include an input receiver configured to receive a touch input related to displayed audiogram from a user, a data processor configured to correct the audiogram corresponding to the touch input, and a display unit configured to display the corrected audiogram. The input receiver may receive a touch input for selecting a plurality of auditory thresholds of a frequency in the audiogram.

The data processor may adjust a frequency band of the audiogram based on the selected auditory thresholds.

An audiogram input apparatus according to yet another example may include an input receiver configured to receive a touch input related to displayed audiogram from a user, a data processor configured to correct the audiogram corresponding to the touch input, and a display unit configured to display the corrected audiogram. The input receiver may receive a first touch input for selecting an auditory threshold corresponding to a frequency in the audiogram and a second touch input for selecting a feature control mode corresponding to the auditory threshold.

The feature control mode may include echo cancellation or feedback cancellation corresponding to the auditory threshold.

An audiogram may be drawn simply by a touch input of the user using a hand, a pen or a stylus. In addition, when the user roughly draws the audiogram on a touch screen, the audiogram input apparatus may correct the audiogram by mapping the entered input to a most approximate auditory threshold. Therefore, a desired audiogram may be achieved. Furthermore, the user may intuitively correct the audiogram by using a simple touch input while looking at the displayed audiogram.

A touch screen as used herein may refer to a display screen that is capable of receiving a touch input, including touches by a finger or a stylus. For example, a touch screen may be a resistive touch screen or a capacitive touch screen. A touch pad may be capable of receiving a touch input, and may or may not include a display screen. A display may include a display screen through which an image may be output to a user.

The above-described examples of methods may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An audiogram input apparatus, comprising:
    an input receiver configured to receive a first touch input at a location located within a rectangular area defined by a frequency axis of an audiogram and an auditory threshold axis of the audiogram;
    a data processor configured to generate a curve of the audiogram by adding a point or a line at the location and to modify the curve according to a pre-quantified audiogram that is quantified in advance, in response to the pre-quantified audiogram being registered; and
    a display unit configured to display the modified curve of the audiogram,
    wherein the modifying of the curve comprises
        initiating a shift mode, in response to detecting that a duration of a second touch input exceeds a threshold,
        dragging the curve in a vertical direction within the rectangular area while maintaining a shape of the curve, in response to detecting the first touch input moving in the vertical direction, and
        dragging the curve in a horizontal direction within the area while maintaining the shape of the curve, in response to detecting the first touch input moving in the horizontal direction.

2. The audiogram input apparatus of claim 1, wherein the input receiver is further configured to receive a third touch input in a form of a point input or a line input via the touch screen.

3. The audiogram input apparatus of claim 1, wherein the input receiver is further configured to sequentially receive a third touch input to select an auditory threshold corresponding to frequency and a fourth touch input to select a feature control mode corresponding to the auditory threshold.

4. The audiogram input apparatus of claim 3, wherein the feature control mode comprises echo cancellation or feedback cancellation corresponding to the curve.

5. The audiogram input apparatus of claim 1, wherein the input receiver is further configured to sequentially receive a third touch input for selecting the curve and a fourth touch input for shifting the entire curve.

6. The audiogram input apparatus of claim 5, wherein the data processor is further configured to shift the entire audiogram based on a distance of dragging of the fourth touch input.

7. A hearing aid device comprising:
the audiogram input apparatus of claim 1; and
an amplifier configured to amplify sound based on the audiogram generated by the audiogram input apparatus.

8. An audiogram input apparatus, comprising:
an input receiver configured to receive a first touch input at a location located within a rectangular area defined by a frequency axis of an audiogram and an auditory threshold axis of the audiogram;
a data processor configured to modify a curve of the audiogram by adjusting a point of the curve according to a pre-quantified audiogram that is quantified in advance, in response to the pre-quantified audiogram being registered; and
a display unit configured to display the modified curve,
wherein the data processor is further configured to further modify the curve by
initiating a shift mode, in response to detecting that a duration of a second touch input exceeds a threshold,
dragging the curve in a vertical direction within the rectangular area while maintaining a shape of the curve, in response to detecting a third touch input moving in the vertical direction, and
dragging the curve in a horizontal direction within the area while maintaining the shape of the curve, in response to detecting the third touch input moving in the horizontal direction.

9. The audiogram input apparatus of claim 8, wherein the input receiver is further configured to sequentially receive a fourth touch input for designating a frequency region of the audiogram and a fifth touch input for adjusting a threshold level of the designated frequency region.

10. The audiogram input apparatus of claim 9, wherein the data processor is further configured to adjust the auditory threshold of the frequency region designated in the audiogram based on a duration of the fifth touch input.

11. The audiogram input apparatus of claim 9, wherein the data processor is further configured to adjust the auditory threshold based on a number of touches of the fifth touch input.

12. The audiogram input apparatus of claim 9, wherein the data processor is further configured to adjust the auditory threshold based on a dragging distance or a release position of the fifth touch input.

13. The audiogram input apparatus of claim 8, wherein the input receiver is further configured to receive a fourth touch input to select a plurality of auditory thresholds of a frequency in the audiogram.

14. The audiogram input apparatus of claim 9, wherein the data processor is further configured to adjust a frequency band of the audiogram based on the curve.

15. A method of inputting an audiogram, the method comprising:
receiving a first touch input at a first location located within a rectangular area defined by a frequency axis of an audiogram and an auditory threshold axis of the audiogram;
displaying a curve of the audiogram by adding a first point at the location or by adding a line at the location;
receiving a second touch input at a second location located within the rectangular area; and
modifying the curve based on the second touch input according to a pre-quantified audiogram that is quantified in advance, in response to the pre-quantified audiogram being registered,
wherein the modifying of the curve comprises
initiating a shift mode, in response to detecting that a duration of a third touch input exceeds a threshold;
dragging the curve in a vertical direction within the rectangular area while maintaining a shape of the curve, in response to detecting the second touch input moving in the vertical direction; and
dragging the curve in a horizontal direction within the area while maintaining the shape of the curve, in response to detecting the second touch input moving in the horizontal direction.

16. The method of claim 15, further comprising:
displaying the modified curve on the touch screen.

17. The method of claim 15, further comprising:
transmitting data of the modified curve to a hearing device to fit the hearing device to a patient.

18. The method of claim 15, further comprising:
amplifying a sound based on data of the modified curve and outputting the amplified sound.

19. The method of claim 15, further comprising:
moving a point on the curve higher on the auditory threshold axis while maintaining continuity of the curve, in response to detecting a fourth touch input located within the area at a position along the frequency axis corresponding to the point,
wherein an extent of the movement of the point corresponds to a duration of the fourth touch input.

20. The method of claim 15, further comprising:
moving a point on the curve higher on the auditory threshold axis while maintaining continuity of the curve, in response to detecting a plurality of touches located within the area at a position along the frequency axis corresponding to the point,
wherein an extent of the movement of the point corresponds to a number of the plurality of touches.

* * * * *